(12) United States Patent
Gordon (10) Patent No.: US 8,069,989 B1
(45) Date of Patent: Dec. 6, 2011

(54) SELF-CLEANING WATER FILTER SYSTEM (76) Inventor: Robert Gordon, Santa Fe, NM (US)

( * ) Notice: Subject to any disclaimer, the term of this patent is extended or adjusted under 35 U.S.C. 154(b) by 1177 days.

(21) Appl. No.: 11/742,145

(22) Filed: Apr. 30, 2007

(51) Int. Cl.
B01D 29/66 (2006.01)

(52) U.S. Cl. .................. 210/408; 210/410; 210/412

(58) Field of Classification Search .................. 210/408, 210/409, 410, 412, 275, 276, 277, 108, 321.69
See application file for complete search history.

(56) References Cited

U.S. PATENT DOCUMENTS

| 322,722 | A | * | 7/1885 | Howes | 210/209 |
| 754,296 | A | * | 3/1904 | Foreman et al. | 210/414 |
| 2,258,063 | A | * | 10/1941 | Meyer | 210/409 |
| 4,037,661 | A | | 7/1977 | Ford | |
| 4,169,792 | A | | 10/1979 | Dovel | |
| 4,210,539 | A | | 7/1980 | Shiban | |
| 5,228,993 | A | | 7/1993 | Dori | |
| 5,490,924 | A | | 2/1996 | Macia et al. | |
| 5,690,824 | A | | 11/1997 | Stuth | |
| 5,910,249 | A | | 6/1999 | Kopp et al. | |
| 6,231,764 | B1 | | 5/2001 | Wilkins | |
| 6,283,305 | B1 | | 9/2001 | Maeda et al. | |
| 2003/0042184 | A1 | * | 3/2003 | McGowan | 210/108 |
| 2005/0139531 | A1 | * | 6/2005 | Gordon | 210/108 |
| 2005/0199551 | A1 | * | 9/2005 | Gordon | 210/650 |
| 2005/0241282 | A1 | * | 11/2005 | Gordon | 55/302 |

FOREIGN PATENT DOCUMENTS

GB 2354185 A 3/2001

* cited by examiner

Primary Examiner — Terry Cecil
(74) Attorney, Agent, or Firm — David A. Guerra (57) ABSTRACT A self-cleaning water filter system for removing particulate matter from water by producing scouring effect which pulls debris or particles off from a filter element when a fluid flow is produced across the filter element. The self-cleaning water filter system has a filter housing having an upper portion, a lower portion, and an internal cavity. A water inlet tube, an exit tube and a water supply line are adapted to be connected to the filter housing. The filter element is positioned within the filter housing and can have a cylindrical or rectangular configuration. A pressure vessel is in fluid communication with the internal cavity of the filter housing. A pressurizable flexible chamber adapted to expand and contract due to the pressure in the filter housing is positioned inside the pressure vessel. At least one perforated flow tube is positioned in the filter housing adjacent to the filter element and in fluid communication with the pressure vessel.

19 Claims, 10 Drawing Sheets

SELF-CLEANING WATER FILTER SYSTEM

CROSS-REFERENCE TO RELATED APPLICATION

Not applicable

FEDERALLY SPONSORED RESEARCH

Not applicable

SEQUENCE LISTING OR PROGRAM

Not applicable

BACKGROUND OF THE INVENTION

1. Field of the Invention

The self-cleaning water filter system has particular utility in connection with removing particulate matter from drinking water using a back flushable filter system.

2. Description of the Prior Art

Self-cleaning water filter systems are desirable filtering drinking water and for providing an affective way to removing particulate matter from drinking water while at the same time provide an efficient and easy system to clean the filter system.

The use of water filters is known in the prior art. For example: U.S. Pat. No. 4,037,661; U.S. Pat. No. 4,169,792; U.S. Pat. No. 4,210,539; U.S. Pat. No. 5,228,993; U.S. Pat. No. 5,490,924; U.S. Pat. No. 5,690,824; U.S. Pat. No. 5,910,249; U.S. Pat. No. 6,231,764; U.S. Pat. No. 6,283,305; and Great Britain Patent Number 2,354,185.

Cartridge type water filters have been used in the past for filtering water in households, building and community systems. Many of these cartridges are designed to filter and collect unwanted particles, such as chlorine, bacteria and other particles that are harmful and sometimes bad tasting. The quantity of particulate material collected on the filter cartridge is directly proportional to the pressure drop and flow rate. The only alternative up to now is either have the expense to buy a new filter cartridge or purchase filtered drinking water in bottles or containers. There exists, therefore, a continuing need for further improvements in fluid filter devices having a self-cleaning filter element. There further exists the need to have a relatively simple and reliable manner of back washing filter elements and reusing thus, avoiding this cost of cartridge replacement or purchasing drinking water.

While the above-described devices fulfill their respective, particular objectives and requirements, the aforementioned patents do not describe a self-cleaning water filter system that allows removing particulate matter from drinking water using a back flushable filter.

Therefore, a need exists for a new and improved self-cleaning water filter system that can be used for removing particulate matter from drinking water using a back flushable filter. In this regard, the present invention substantially fulfills this need. In this respect, the self-cleaning water filter system according to the present invention substantially departs from the conventional concepts and designs of the prior art, and in doing so provides an apparatus primarily developed for the purpose of removing particulate matter from drinking water using a back flushable filter.

SUMMARY OF THE INVENTION

In view of the foregoing disadvantages inherent in the known types of water filters now present in the prior art, the present invention provides an improved self-cleaning water filter system, and overcomes the above-mentioned disadvantages and drawbacks of the prior art. As such, the general purpose of the present invention, which will be described subsequently in greater detail, is to provide a new and improved self-cleaning water filter system and method which has all the advantages of the prior art mentioned heretofore and many novel features that result in a self-cleaning water filter system which is not anticipated, rendered obvious, suggested, or even implied by the prior art, either alone or in any combination thereof.

To attain this, the present invention essentially comprises a self-cleaning water filter system for removing particulate matter from water by producing scouring effect which pulls debris or particles off from a filter element when a fluid flow is produced across the filter element. The self-cleaning water filter system has a filter housing having an upper portion, a lower portion, and an internal cavity. A water inlet tube, an exit tube and a water supply line are adapted to be connected to the filter housing. The filter element is positioned within the filter housing and can have a cylindrical or rectangular configuration. A pressure vessel is in fluid communication with the internal cavity of the filter housing. A pressurizable flexible chamber adapted to expand and contract due to the pressure in the filter housing is positioned inside the pressure vessel. At least one perforated flow tube is positioned in the filter housing adjacent to the filter element and in fluid communication with the pressure vessel.

The self-cleaning water filter system may contain a vibration device attachable to and in fluid communication with the lower portion of the filter housing below the filter element and the water supply line. The vibration device has an inbalanced wheel with a plurality of paddles thereon. Additionally, a one-way valve may be attached to and in fluid communication with the vibration device and the water supply line.

There has thus been outlined, rather broadly, the more important features of the invention in order that the detailed description thereof that follows may be better understood and in order that the present contribution to the art may be better appreciated.

The invention may also include a manifold attached to the water inlet tube, with at least one perforate flow tube extending down from the manifold into an outer chamber defined between the filter element and the filter housing. There are, of course, additional features of the invention that will be described hereinafter and which will form the subject matter of the claims attached.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved self-cleaning water filter system that has all of the advantages of the prior art water filters and none of the disadvantages.

It is another object of the present invention to provide a new and improved self-cleaning water filter system that may be easily and efficiently manufactured and marketed.

An even further object of the present invention is to provide a new and improved self-cleaning water filter system that has a low cost of manufacture with regard to both materials and labor, and which accordingly is then susceptible of low prices of sale to the consuming public, thereby making such self-cleaning water filter system economically available to the buying public.

Still another object of the present invention is to provide a new self-cleaning water filter system that provides in the apparatuses and methods of the prior art some of the advantages thereof, while simultaneously overcoming some of the disadvantages normally associated therewith.

Even still another object of the present invention is to provide a self-cleaning water filter system for removing particulate matter from drinking water using a back flushable filter. This allows for an efficient and cost effective water filter system which provides a back flushing process that creates a scouring effect along across the filter element that pulls off debris and particles therefrom.

Lastly, it is an object of the present invention to provide a new and improved method of operating a self-cleaning water filter system. The method has a filtration stage and a back flushing stage for cleaning the filter element.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various figures.

DESCRIPTION OF THE PREFERRED EMBODIMENT

Referring now to the drawings and particularly to FIGS. 1-14, a preferred embodiment of the self-cleaning water filter system of the present invention is shown and generally designated by the reference numeral 10. The terminology used in the description presented herein is intended to be interpreted in its broadest reasonable manner in accordance with its ordinary use in the art and in accordance with any overt definitions provided below.

Figure 1:
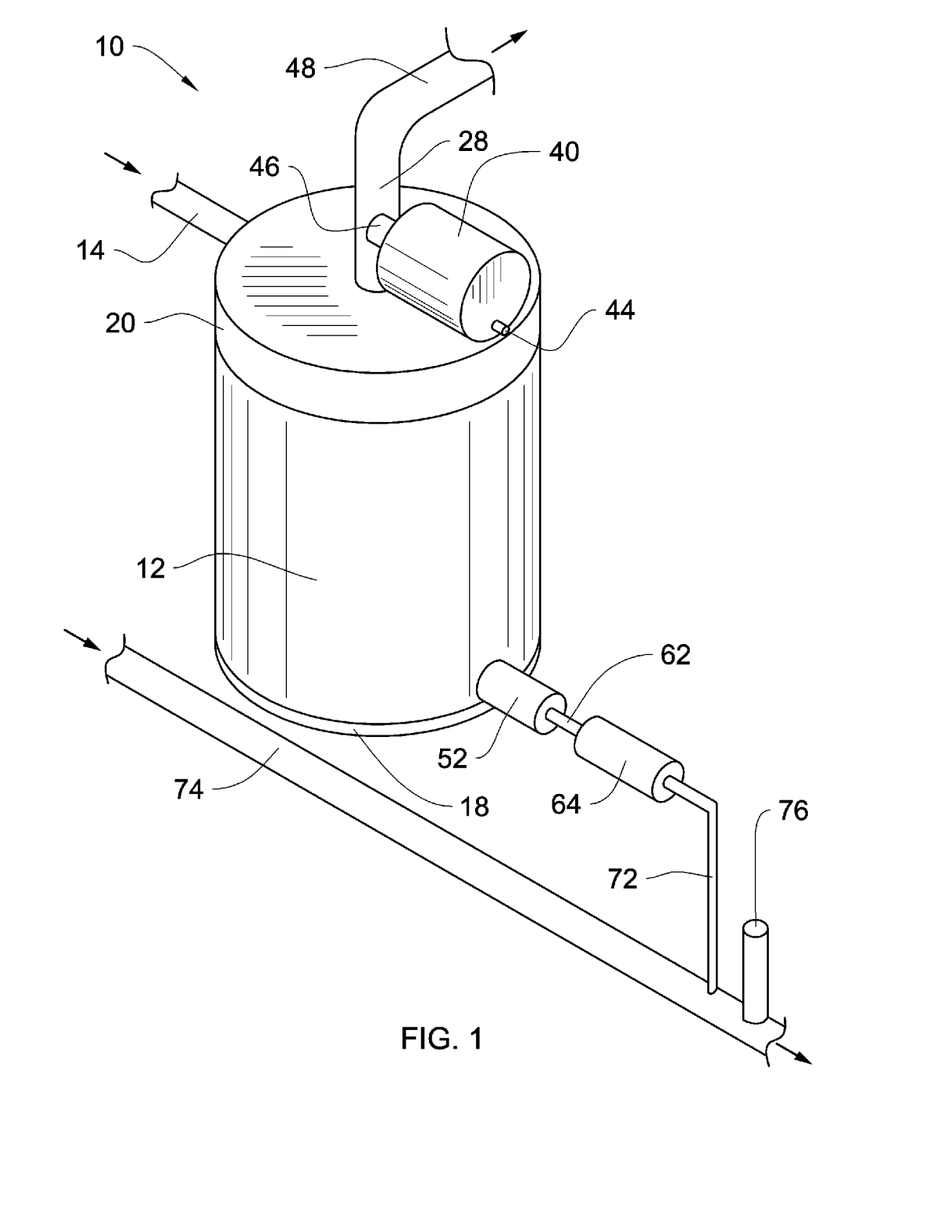
FIG. 1 is a perspective view of the preferred embodiment of the self-cleaning water filter system constructed in accordance with the principles of the present invention, with the phantom lines depicting environmental structure and forming no part of the claimed invention.

In FIG. 1, a new and improved self-cleaning water filter system 10 of the present invention for removing particulate matter from drinking water using a back flushable filter system is illustrated and will be described. The self-cleaning water filter system 10 may be mounted under a kitchen sink or any hot/cold water line source. More particularly, the self-cleaning water filter system 10 has a filter housing 12 having a bottom plate 18, and a manifold 20. The filter housing 12 has a generally cylindrical configuration featuring an internal chamber, an upper portion, and a lower portion. The filter housing 12 can be provided with mounting brackets (not shown) so as secure the filter housing 12 to a wall, ceiling, floor or other support structure. The bottom plate 18 is fixedly or removable attachable to the lower portion of the filter housing 12, and the manifold 20 is fixedly or removable attachable to the upper portion of the filter housing 12. The manifold 20 is adapted to receive therethrough a cold water inlet tube 14 and an inner flow tube 28. The inner flow tube 28 passes through the manifold 20 at its center parallel with the longitudinal axis of the filter housing 12. A pressure vessel 40 is connected to the inner flow tube 28 above the manifold 20, and an exit tube 48 is connected to the inner flow tube 28. A flow powered vibration device 52 is connected to the lower portion of the filter housing 12 perpendicular to the longitudinal axis of the filter housing 12. It is appreciated that the vibration device 52 can be connected to the lower portion of the filter housing 12 in any location and angular orientation. A tube 62 connects a one-way valve 64 to the vibration device 52. A second tube 72 connects the one-way valve 64 to a hot water supply line 74. A water hammer dampening device 76 is then connected to the hot water supply line 74 adjacent of the second tube 72.

Figure 2:
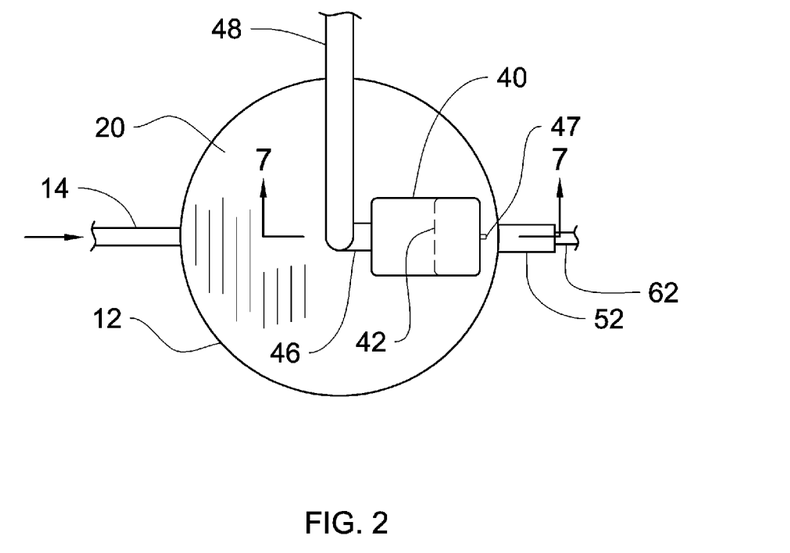
FIG. 2 is a top elevational view of the self-cleaning water filter system of the present invention.

FIG. 2 is a top view illustrating one possible exit tube 48 and pressure vessel 40 configuration.

Figure 3:
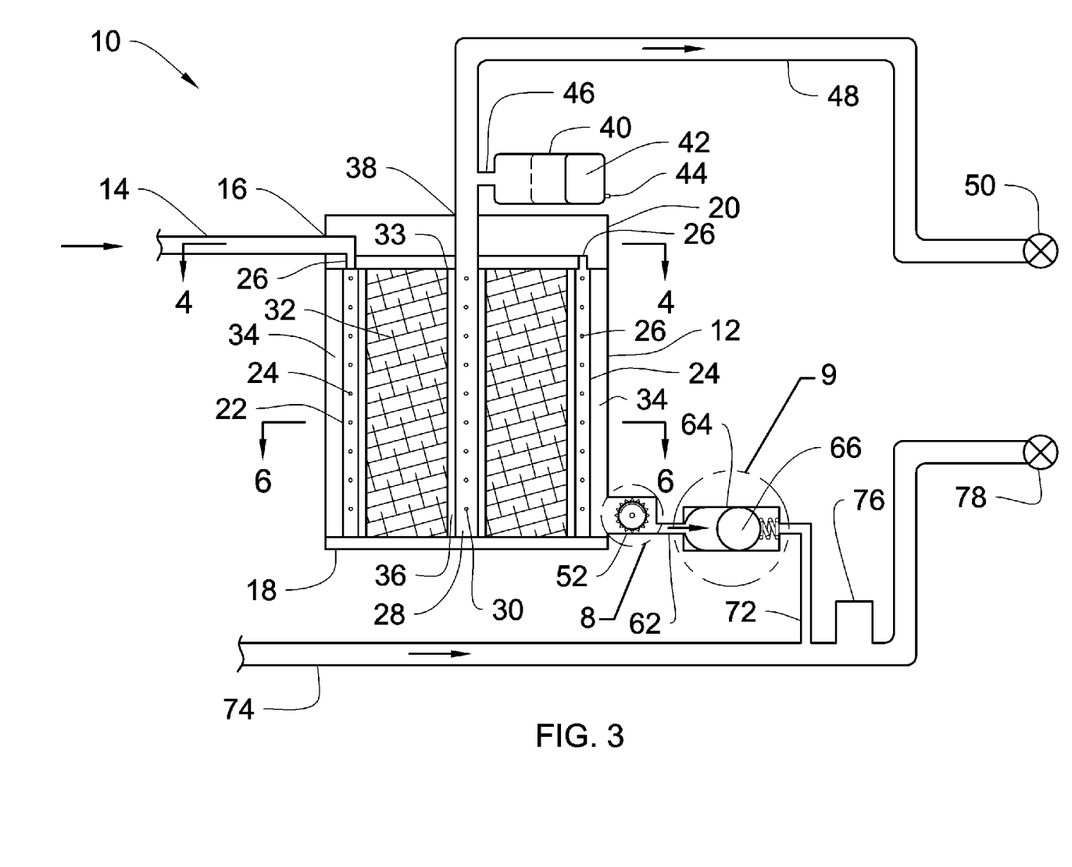
FIG. 3 is a cross-sectional view of the self-cleaning water filter system of the present invention.

The exit tube 48 is connected to an exit tube valve 50 adjacent of the pressure vessel 40, and the hot water supply line 74 is connected to a hot water supply line valve 78 adjacent of the water hammer dampening device 76, as best illustrated in FIG. 3. It should be noted that FIG. 3 is an illustrative cross-sectional view of the self-cleaning water filter system 10 without element thickness so as clearly show the elements without confusion or obstruction. One skilled in the art can appreciate that the elements have thickness.

Figure 4:
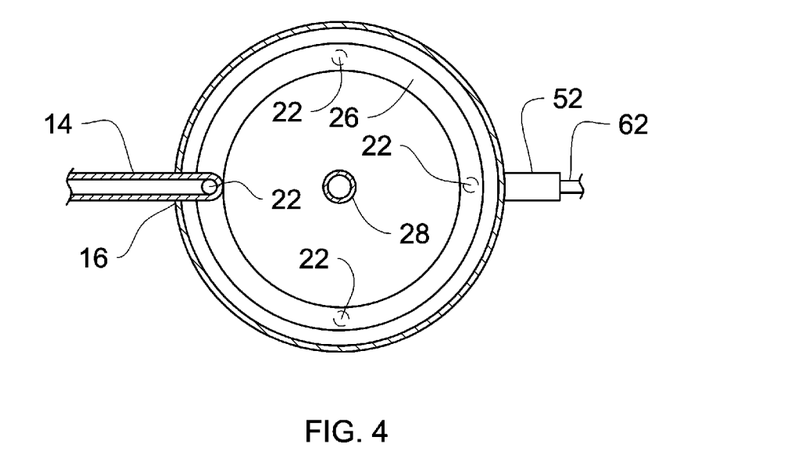
FIG. 4 is a cross-sectional view of the self-cleaning water filter system of the present invention taken along line 4-4 in FIG. 3.

The cold water inlet tube 14 passes through the side of the manifold 20 perpendicular to the longitudinal axis of the filter housing 12 through a cold water tube seal 16. It can be appreciated that the cold water inlet tube 14 can enter and pass through the manifold 20 at any desirable and functionable angle. The cold water inlet tube 14 is connected to a cold water manifold chamber 26 located within the manifold 20 and to the bottom plate 18. Multiple perforated flow tubes 22 are connected to the cold water manifold chamber 26, and extend down into the filter housing 12 parallel with the longitudinal axis of the filter housing 12 and around a filter element 32. The cold water manifold chamber 26 is generally circular in configuration with each flow tube 22 connected thereto radially, as best illustrated in FIG. 4. The flow tubes 22 each have at least two rows of perforations 24 at angles that allow flows directed at a tangential direction in respect to the filter element 32 and running the length of the inner flow tube 28 between the bottom plate 18 and the manifold 20. The flow tubes 22 are positioned in an outer chamber 34 located between the filter housing 12 and the filter element 32.

The filter element 32 can be any suitable water filtering medium, such as but not limited to, a semi-permeable filter. The filter element 32 has a generally cylindrical configuration featuring a central bore 33, wherein the filter element 32 may be pleated. It can be appreciated that any geometrical configuration of the filter element 32 can be used as long as it can be received within the filter housing 12 and the flow tubes 22. The bottom plate 18 and the manifold 20 of the filter housing 12 supports and secures the filter element 32 in position.

Figure 6:
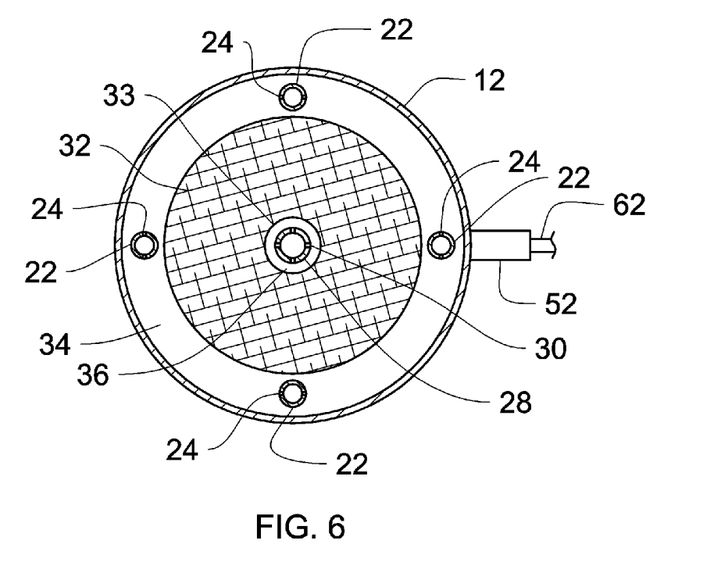
FIG. 6 is a cross-sectional view of the self-cleaning water filter system of the present invention taken along line 6-6 in FIG. 3.

A perforated inner flow tube 28 connected to the bottom plate 18 and is adapted to pass through an inner chamber 36 defined by the bore 33 of the filter element 32. The inner flow tube 28 is parallel with the flow tubes 22 and passes through and exits the manifold 20 through inner flow tube seal 38. The inner flow tube 28 has at least four rows of perforations 30 about 90° apart running the length of the inner flow tube 28 between the bottom plate 18 and the manifold 20. The exit tube 48 is connected to the inner flow tube 28 adjacent of the pressure vessel 40. FIG. 6 best illustrates the cold water tubes 22 positioned in the outer chamber 34 surrounding the filter element 32, with inner flow tube 28 positioned in the inner chamber 36 surrounded by the bore 33 of the filter element 32 all within the filter housing 12, as described above.

Figure 5:
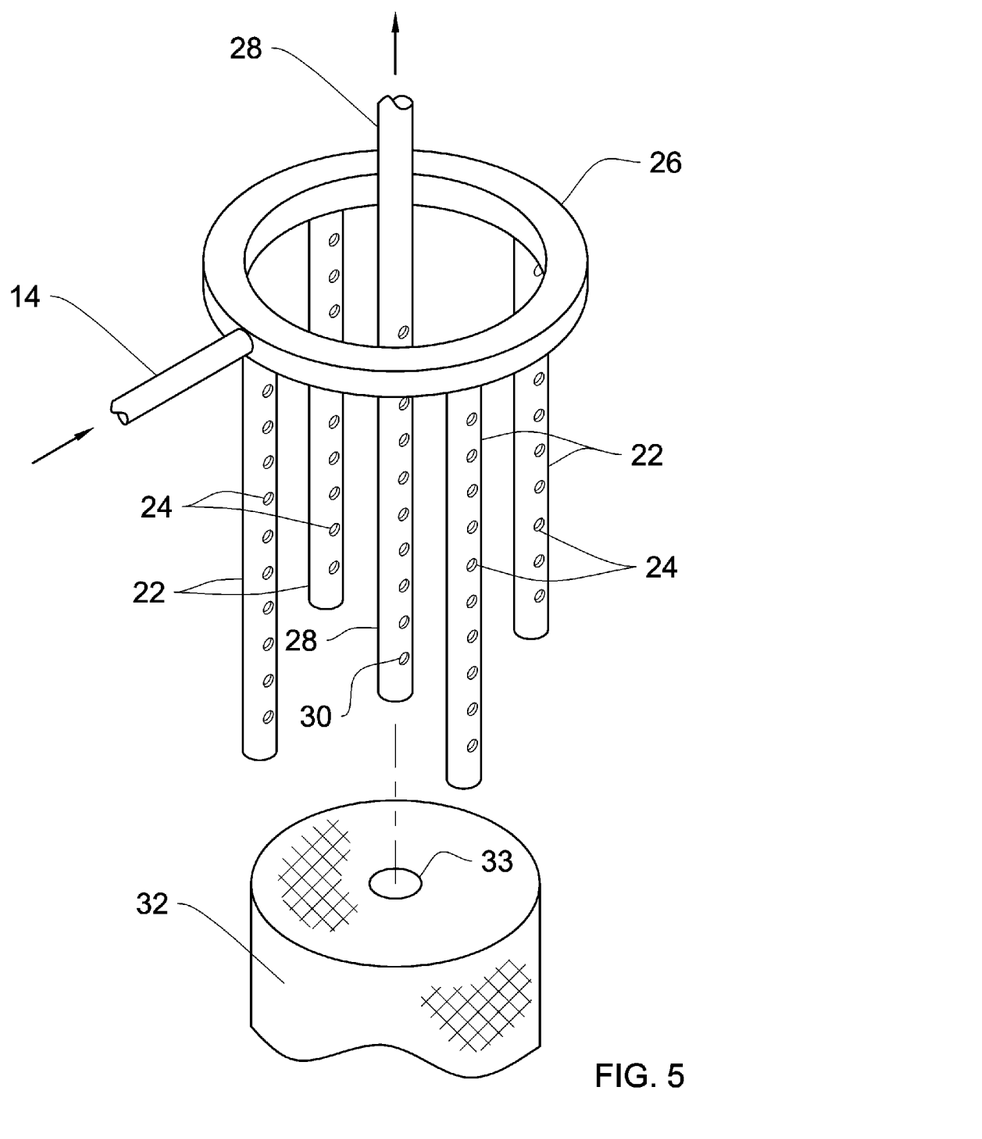
FIG. 5 is an exploded perspective view of the self-cleaning water filter system of the present invention.

As best illustrated in FIG. 5, the cold water inlet tube 14 is connected to the cold water manifold chamber 26 which has multiple, at least four, flow tubes 22 extending down around the filter element 32. The inner flow tube 28 is adapted to be received within the bore 33 of the filter element 32. It can therefore be appreciated from the above description that the cold water inlet tube 14 is in fluid communication with the cold water manifold chamber 26 which is in fluid communication with the multiple perforated flow tubes 22. The flow tubes 22 are in fluid communication with the outer chamber 34 which is fluid communication with filter element 32 via perforations 24. The perforated inner flow tube 28 is in fluid communication with the inner chamber 36 via perforations 30, with inner chamber 36 in fluid communication with the filter element 32.

Figure 7:
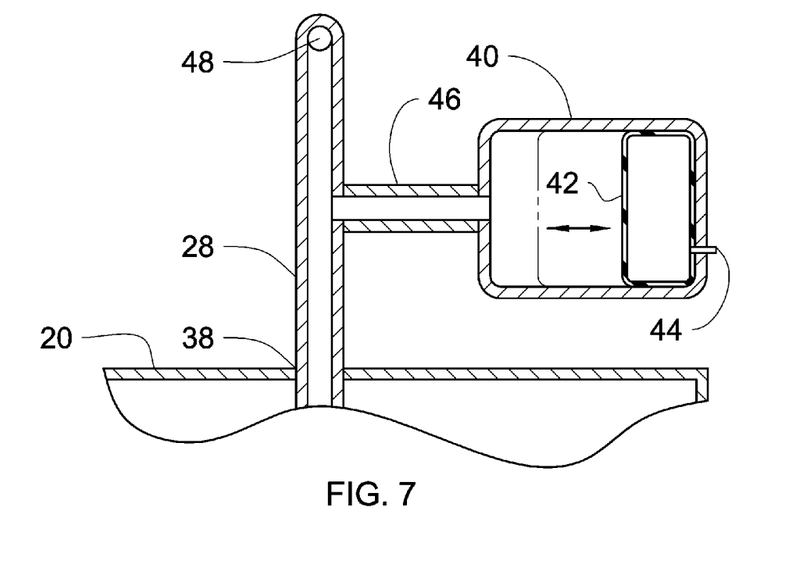
FIG. 7 is a cross-sectional view of the self-cleaning water filter system of the present invention taken along line 7-7 in FIG. 2.

Referring to FIG. 7, the pressure vessel 40 is connected to the inner flow tube 28 through pressure vessel tube 46. The pressure vessel 40 has a pressurized, flexible chamber 42 therein. The flexible chamber 42 is adapted to expand or contract within the interior cavity of the pressure vessel 40. A sealed valve stem 44 is connected to the flexible chamber 42. The flexible chamber 42 is at least partially filled with a gas, such as but not limited to, air to a predetermined pressure with valve stem 44. Therefore, the pressure vessel 40 is in fluid communication with the pressure vessel tube 46 which is in fluid communication with inner flow tube 28 adjacent of the manifold 20. Furthermore, exit tube 48 in fluid communication with inner flow tube 28 adjacent of the pressure vessel tube 46.

Figure 8:
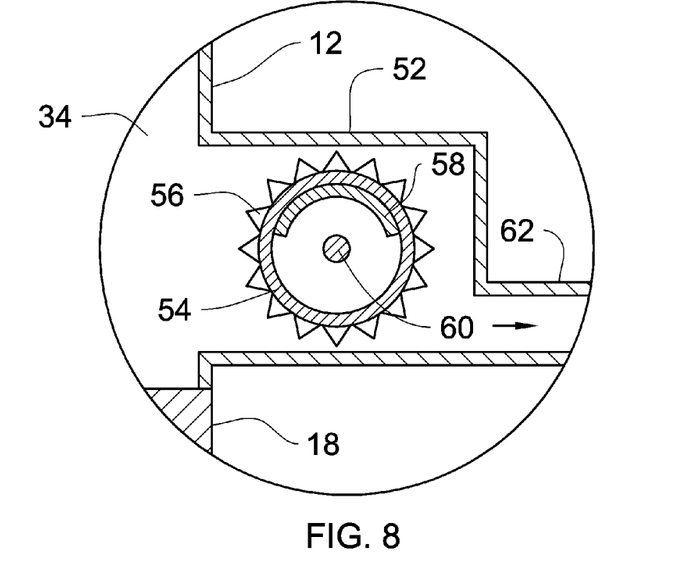
FIG. 8 is an enlarged view of the flow powered vibration device of the self-cleaning water filter system of the present invention.

The flow powered vibration device 52 is connected, as one possible embodiment, to an outlet located in the lower portion of the filter housing 12 above the bottom plate and in fluid communication with the outer chamber 34. As best illustrated in FIG. 8, the flow powered vibration device 52 has an imbalanced wheel 54 therein rotatably connected to the vibration device 52 via an axle or shaft 60. The wheel 54 contains a plurality of paddles or fins 56 extending radially outwards therefrom, and a weight 58 connected on the interior side thereof. The vibration device 52 features an outlet located adjacent of the wheel 54 positioned below the axle 60 and sized not to exceed more than half the size of the wheel 54 so as to produce a tangential flow. The tangential flow rotates the paddles 56 on the wheel 54 which, due to the imbalancing features of each wheel 54, produces vibration in the form of periodic motion of the vibration device 52. The wheel 54 may be coupled via axle 60 to flanges (not shown) located on the side of a vibration device 52 in which a portion of the wheel may be recessed from the tube 62. The wheel 54 rotates along an axis that is misaligned with respect to the center of mass of the wheel 54. Thus, rotation of the wheel 54 generates a periodic force along a line as the center of mass of the wheel defines an orbit around the axle 60. The force along the line is transmitted via the axle 60 and vibration device 52 so that the entire vibration device 52 moves periodically back and force in a vibratory motion. The above vibration device 52 contains similarities to the vibrators found in co-pending and commonly owned U.S. patent applications 2005/0139531, 2005/0241282, and 2005/0199551, wherein the entire disclosures of the prior applications are incorporated herein by reference.

The vibration device 52 can be connected at any suitable location to a filtering system as discussed above. For example, the vibration device 52 may be fluidly coupled to the cold water inlet tube 14, or the hot water supply line 74. If coupled to the cold water inlet tube 14, the vibration device 52 may be configured to vibrate continuously as the fluid is filtered by the filter housing 12. If coupled to the hot water supply line 74, the vibration device 52 may be configured to vibrate during back flushing of the filter housing 12.

Figure 9:
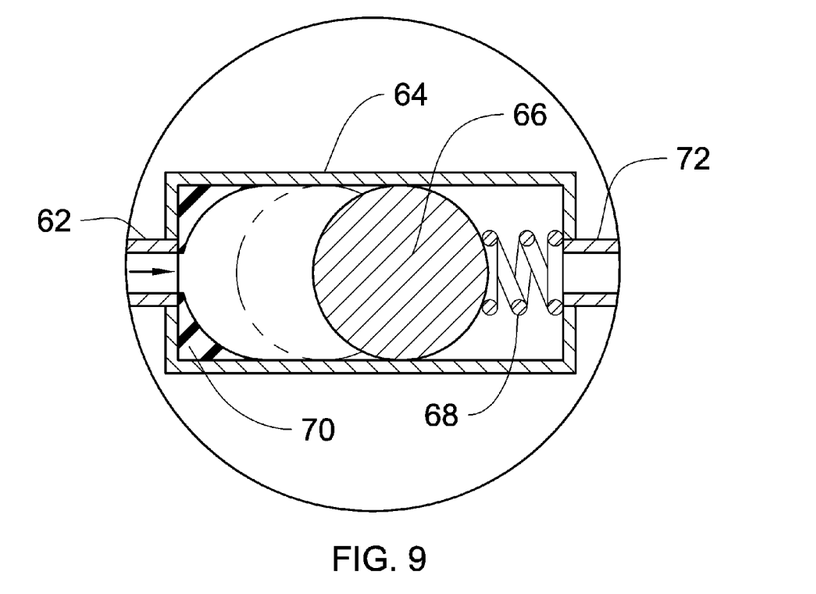
FIG. 9 is an enlarged view of the one-way valve of the self-cleaning water filter system of the present invention.

As best illustrated in FIG. 9, the one-way valve 64 is connected, as one possible embodiment, to and in fluid communication with the tube 62 opposite of the vibration device 52. The one-way valve 64 has a ball 66, a seal 70, and a spring 68. The seal 70 is positioned toward the side of incoming flow and features a passageway allowing fluid to flow therethrough. The seal 70 is configured to correspond to the shape of the ball 66. The ball 66 is configured to allow fluid to pass therearound when not in contact with the seal 70. The spring 68 is positioned on the side of the one-way valve 64 opposite the seal 70 for providing a pushing force on the ball 66 toward the seal 70. The one-way valve 64 is connected to the hot water supply line 74 through second tube 72. The seal 70 may be made of any suitable sealing material, such as but not limited to, plastic, rubber, metal, or composite material. It can be appreciated that the ball 66 may have any geometrical configuration receivable within the one-way valve 64, and wherein the seal 70 may have any shape corresponding to the ball 66 so as to produce a tight seal that does not allow fluid to pass.

The hot water supply line 74 is in fluid communication with the second tube 72 which is in fluid communication with the one-way valve 64. The water hammer dampening device 76 is connected to and in fluid communication with the hot water supply line 74. The hot water supply line valve 78 is connected to the hot water supply line 74 adjacent of the water hammer dampening device 76. The water hammer dampening device 76 is used to prevent any water hammer present in the hot water supply line 74 during the opening and closing of the hot water supply line valve 78. The water hammer dampening device 76 has an air space located in its upper portion thereby allowing for a column on fluid to rise and fall dampening the hammer affect of the fluid from the hot water supply line 74.

In use, it can now be understood that the self-cleaning water filter system 10 operates in at least two stages. The first stage is the filtration stage. Cold water supply tube 14 flows when exit tube valve 50 is opened and the hot water supply line valve 78 is closed. It is typical in a building or other system, that both the cold water and hot water lines have the same pressure since both hot and cold water are supplied by the same source. When exit tube valve 50 is opened, the pressure in cold water inlet tube 14, the exit tube 48 and the outer chamber 34 are now lower than hot water supply line 74. Therefore one-way valve 64 does not allow flow or is turned off automatically. Keeping this in mind the filtration process stage will now be fully described.

When exit tube valve 50 is opened cold water is supplied by cold water inlet tube 14 which then fills the cold water manifold chamber 26. The cold water manifold chamber 26 then supplies fluid flows into each of the perforated flow tubes 22. Cold water travels down each of the flow tubes 22 and is then sprayed out at a tangential angles to the filter element 32 through the rows of perforations 24 that are spaced at angles tangent to the filter element 32 on each of the flow tubes 22. The outer chamber 34 is then filled and slightly pressurized but still having a significant less pressure than the hot water supply line 74. The water in the outer chamber 34 is then filtered as it flows through semi-permeable filter element 32. The filtered water then fills the inner chamber 36 and enters the inner flow tube 28 through perforations 30. The now filtered water then flows up inner flow tube 28 and out through the manifold 20 opening into exit tube 48 then out the exit tube valve 50 for its end use.

The second stage of the self-cleaning water filter system 10 is the back flushing or cleaning stage of the filter element 32. Exit tube valve 50 is closed and the pressure between the cold water inlet tube 14, the exit tube 48, the hot water supply line 74, the outer chamber 34, and the inner chamber 36 now become balanced or are the same pressure. At this time inner flow tube 28 supplies pressurized flow or energy through pressure vessel tube 46 and this pressure or stored energy is saved in pressure vessel 40 for later use. This stored energy is produced by the gas pressurized flexible chamber 42 which is pre-filled with a gas such as air to a predetermined pressure through valve stem 44. When exit tube valve 50 is closed this pressurized flexible chamber 42, since it is a gas, can be compressed and therefore contracts or becomes smaller but at the same time the gas pressure further increases and energy stored because of its compression. When the hot water supply line valve 78 is opened the hot water supply line 74 and outer chamber 34 become lower than the pressure in inner chamber 36 because one-way valve 64 is automatically opened. The stored energy or pressure is now released by pressure vessel 40. The flexible chamber 42 in the pressure vessel 40 now expands to a larger size as the energy is dissipated. A reverse flow is now produced which travels into perforated inner flow tube 28 from exit tube 48 and pressure vessel tube 46 since exit tube valve 50 is off and then out the inner flow tube perforations 30 spaced about 90 degrees apart in sprays directed perpendicular towards filter element 32. At this point the pressure in inner chamber 36 is greater than that of outer chamber 34 thus allowing this stored clean water to flow in the opposite direction then before through and back flushing filter element 32. In combination, the cold water inlet tube 14 also has a smaller flow supplying water that sprays tangentially to the filter element 32 through the flow tube perforations 24. These tangential sprays also help the back washed particles to be removed from the filter element 32 with a scouring effect. This now dirty fluid is now forced out through the vibration device 52 and tube 62, and then through the one-way valve 64 and second tube 72 into hot water supply line 74. Since tube 62 is smaller compared to cold water inlet tube 14, exit tube 48, and hot water supply line 74, the amount of cold water mixing with the hot water in hot water supply line 74 is very small therefore not noticeable to the slightly lower pressure in hot water supply line 74.

It has been found that vibration of the filter element 32 is highly effective in cleaning off particles therefrom. When the above-described back flushing occurs, fluid flow is traveling through tube 62 and since it is smaller, a high velocity of flow activates the flow powered vibration device 52 which is rigidly connected to the filter housing 12 therefore vibrating the filter element 32 during the back flushing stage. When the opening and closing of one-way valve 64 occurs, water hammer maybe present therefore as an added precaution the water hammer dampening device 76 is fluidly connected to hot water supply line 74 adjacent of the one-way valve 64 to prevent damage to the self-cleaning water system 10.

Figure 10:
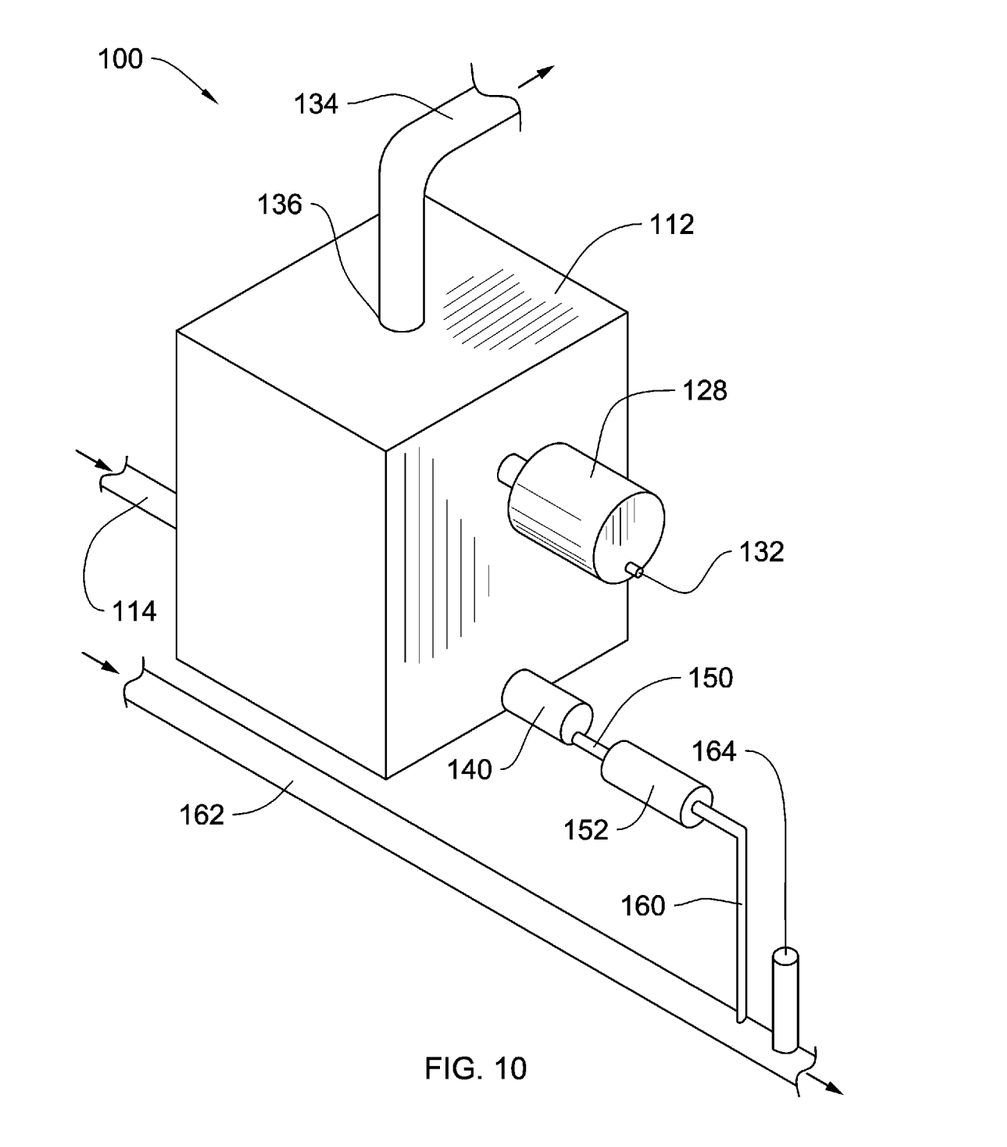
FIG. 10 is a perspective view of the alternate embodiment of the self-cleaning water filter system of the present invention.

Referring now to FIG. 10, an alternate embodiment self-cleaning water filter system 100 of the present invention for removing particulate matter from drinking water using a back flushable filter system is illustrated and will be described. The self-cleaning water filter system 100 may be mounted under a kitchen sink or any hot/cold water supply line. More particularly, the self-cleaning water filter system 100 has a filter housing 112 having a generally rectangular configuration featuring an internal chamber, an upper portion, and a lower portion. The filter housing 112 is adapted to receive therethrough a cold water inlet tube 114 and an exit tube 134. A pressure vessel 128 is connected to the upper portion of the filter housing 112. A flow powered vibration device 140 is connected to the lower portion of the filter housing 112 perpendicular to the longitudinal axis of the filter housing 112. It is appreciated that the vibration device 140 can be connected to the lower portion of the filter housing 112 in any location and angular orientation. A tube 150 connects a one-way valve 152 to the vibration device 140. A second tube 160 connects the one-way valve 152 to a hot water supply line 162. A water hammer dampening device 164 is then connected to the hot water supply line 162 adjacent of the second tube 160.

Figure 11:
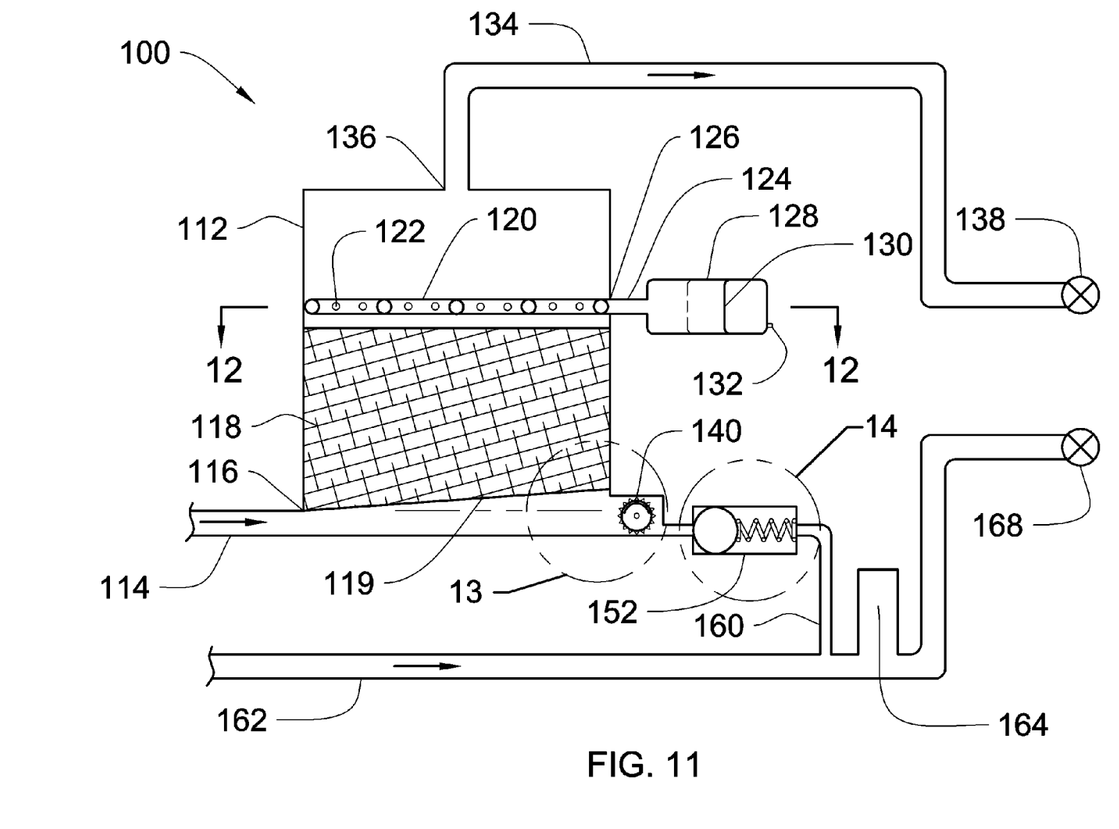
FIG. 11 is a partial cross-sectional view of the alternate embodiment self-cleaning water filter system of the present invention.

The exit tube 134 is connected to an exit tube valve 138 adjacent of the filter housing 112, and to the upper portion of the filter housing 112 through an exit tube seal 136. The hot water supply line 162 is connected to a hot water supply line valve 168 adjacent of the water hammer dampening device 164, as best illustrated in FIG. 11. It should be noted that FIG. 11 is an illustrative cross-sectional view of the self-cleaning water filter system 100 without element thickness so as clearly show the elements without confusion or obstruction. One skilled in the art can appreciate that the elements have thickness.

As best illustrated in FIG. 11, the cold water inlet tube 114 is connected to the lower portion of the filter housing 112 through a cold water tube seal 116 positioned below a filter element 118. It can be appreciated that the cold water inlet tube 114 can be connected to the filter housing 112 at any desirable and functionable angle.

The filter element 118 can be any suitable water filtering medium, such as but not limited to, a semi-permeable pleated filter. The filter element 118 has a generally rectangular configuration featuring a bottom 119. It can be appreciated that any geometrical configuration of the filter element 118 can be used as long as it can be received within the filter housing 112. The bottom 119 is angled outward or away from the flow from the cold water inlet tube 114 at a predetermined angle θ. Angle θ is from about 0° to less than 90° in relation to the fluid flow from cold water inlet tube 114. The angle bottom 119 produces a scouring effect in which debris or particles are pulled off the filter element 118 when a flow is passed by the bottom 119 and through the vibration device 140 when the one-way valve 152 is opened.

The pressure vessel 128 is connected to a pressure vessel tube 124 which is connected to the filter housing 112 through a pressure vessel tube seal 126. The pressure vessel 128 has a pressurized, flexible chamber 130 therein. The flexible chamber 130 is adapted to expand or contract within the interior cavity of the pressure vessel 128. A sealed valve stem 132 is connected to the flexible chamber 130. The flexible chamber 130 is at least partially filled with a gas, such as but not limited to, air to a predetermined pressure with valve stem 132.

Figure 12:
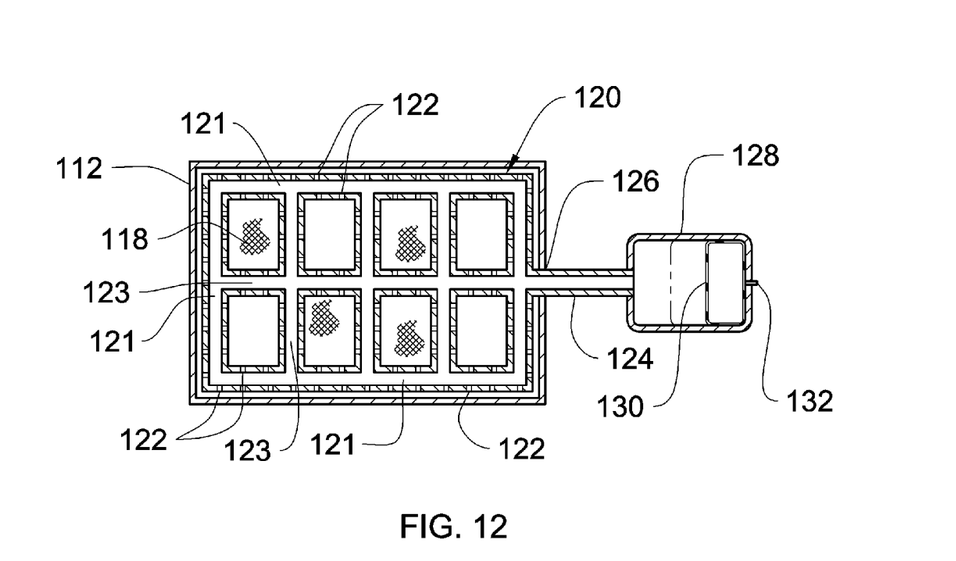
FIG. 12 is a cross-sectional view of the alternate embodiment self-cleaning water filter system of the present invention taken along line 12-12 in FIG. 11.

The pressure vessel tube 124 is connected to a perforated flow tube assembly 120. The flow tube assembly 120 contains a generally rectangular manifold-like outer flow tube 121 with multiple internal flow tubes 123 positioned between the outer flow tube 121, as best illustrated in FIG. 12. The flow tube assembly 120 is located above the filter element 118 and below the exit tube 134. The flow tube assembly 120 has at least two rows of perforations 122 about 90° apart facing towards filter element 118. The perforations 122 are arranged so that the sprays from the perforations 122 impinge upon adjacent sprays to result in at least a partial perpendicular direction toward filter element 118. Therefore, the pressure vessel 128 is in fluid communication with the pressure vessel tube 124 which is in fluid communication with flow tube assembly 120. Furthermore, exit tube 134 is in fluid communication with the area above the flow tube assembly 120.

Figure 13:
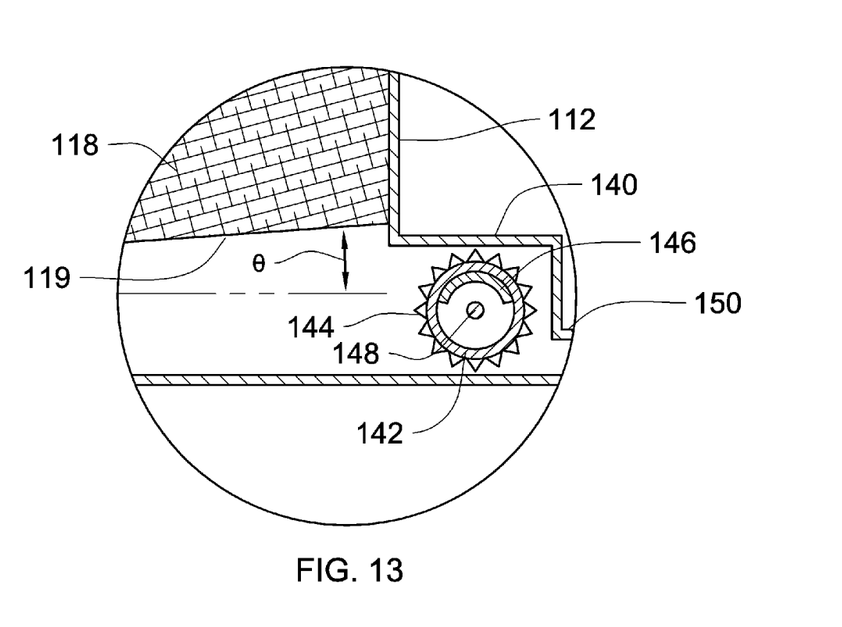
FIG. 13 is an enlarged view of the flow powered vibration device of the alternate embodiment self-cleaning water filter system of the present invention.

The flow powered vibration device 140 is connected, as one possible embodiment, to an outlet located in the lower portion of the filter housing 112 below the filter element 118 and in fluid communication with the area below the filter element 118 and cold water inlet tube 114. As best illustrated in FIG. 13, the bottom 119 of the filter element 118 is angled upwards at an angle θ so as not to obstruct the flow powered vibration device 140. The flow powered vibration device 140 has an imbalanced wheel 142 therein rotatably connected to the vibration device 140 via an axle or shaft 148. The wheel 142 contains a plurality of paddles or fins 144 extending radially outwards therefrom, and a weight 146 connected on the interior side thereof. The vibration device 140 features an outlet located adjacent of the wheel 142 positioned below the axle 148 and sized not to exceed more than half the size of the wheel 142 so as to produce a tangential flow. The tangential flow rotates the paddles 144 on the wheel 142 which, due to the imbalancing features of each wheel 142, produces vibration in the form of periodic motion of the vibration device 140. The wheel 142 may be coupled via axle 148 to flanges (not shown) located on the side of a vibration device 140 in which a portion of the wheel may be recessed from the tube 150. The wheel 142 rotates along an axis that does is misaligned with respect to the center of mass of the wheel 142. Thus, rotation of the wheel 142 generates a periodic force along a line as the center of mass of the wheel defines an orbit around the axle 148. The force along the line is transmitted via the axle 148 and vibration device 140 so that the entire vibration device 140 moves periodically back and force in a vibratory motion.

The vibration device 140 can be connected at any suitable location to a filtering system below the filter element 118 as discussed above. For example, the vibration device 140 may be fluidly coupled to the cold water inlet tube 114, or the hot water supply line 162. If coupled to the cold water inlet tube 114, the vibration device 140 may be configured to vibrate continuously as the fluid is filtered by the filter housing 112. If coupled to the hot water supply line 162, the vibration device 140 may be configured to vibrate during back flushing of the filter housing 112.

Figure 14:
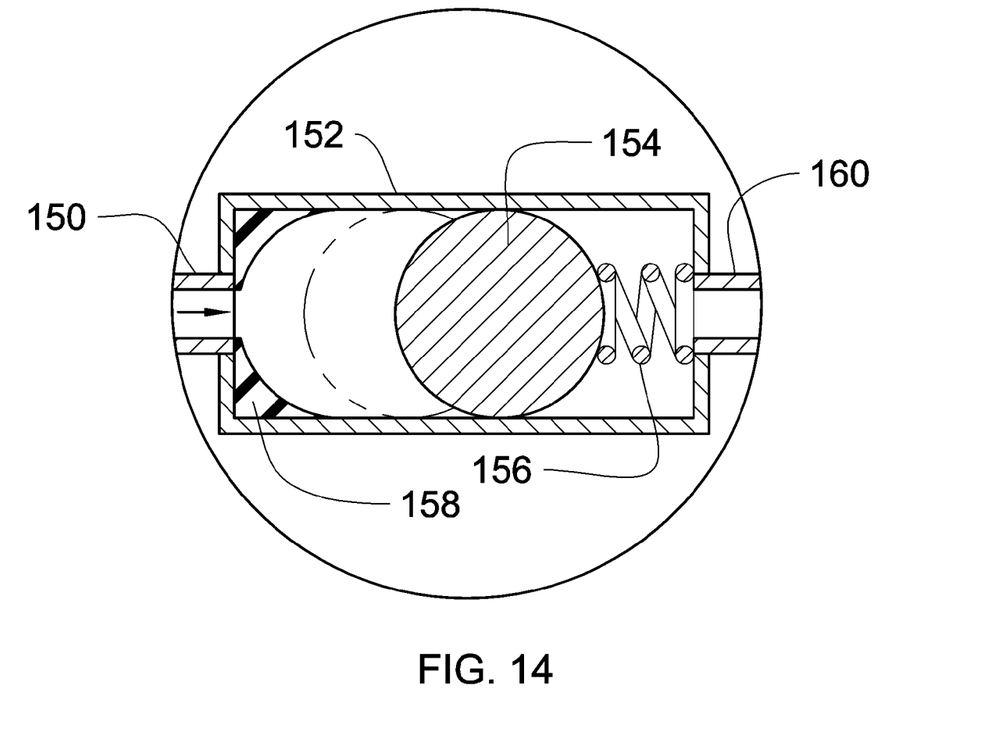
FIG. 14 is an enlarged view of the one-way valve of the alternate embodiment self-cleaning water filter system of the present invention.

As best illustrated in FIG. 14, the one-way valve 152 is connected, as one possible embodiment, to and in fluid communication with the tube 150 opposite of the vibration device 140. The one-way valve 152 has a ball 154, a seal 158, and a spring 156. The seal 158 is positioned toward the side of incoming flow and features a passageway allowing fluid to flow therethrough. The seal 158 is configured to correspond to the shape of the ball 154. The ball 154 is configured to allow fluid to pass therearound when not in contact with the seal 158. The spring 156 is positioned on the side of the one-way valve 64 opposite the seal 158 for providing a pushing force on the ball 154 toward the seal 158. The one-way valve 152 is connected to the hot water supply line 162 through a second tube 160. The seal 158 may be made of any suitable sealing material, such as but not limited to, plastic, rubber, metal, or composite material. It can be appreciated that the ball 154 may have any geometrical configuration receivable within the one-way valve 152, and wherein the seal 158 may have any shape corresponding to the ball 154 so as to produce a tight seal that does not allow fluid to pass.

The hot water supply line 162 is in fluid communication with the second tube 160 which is in fluid communication with the one-way valve 152. The water hammer dampening device 164 is connected to and in fluid communication with the hot water supply line 162. The hot water supply line valve 168 is connected to the hot water supply line 162 adjacent of the water hammer dampening device 164. The water hammer dampening device 164 is used to prevent any water hammer present in the hot water supply line 162 during the opening and closing of the hot water supply line valve 168. The water hammer dampening device 164 has an air space located in its upper portion thereby allowing for a column on fluid to rise and fall dampening the hammer affect of the fluid from the hot water supply line 162.

In use, it can now be understood that the self-cleaning water filter system 100 operates in at least two stages. The first stage is the filtration stage. Cold water supply tube 114 flows when exit tube valve 138 is opened and the hot water supply line valve 168 is closed. It is typical in a building or other system, that both the cold water and hot water lines have the same pressure since both hot and cold water are supplied by the same source. When exit tube valve 138 is opened, the pressure in cold water inlet tube 114, the exit tube 134 and the area above the filter element 118 are now lower than hot water supply line 162. Therefore one-way valve 152 does not allow flow or is turned off automatically. Keeping this in mind the filtration process stage will now be fully described.

Cold water is supplied by cold water inlet tube 114 which then fills the lower portion of the filter housing 112 below the filter element 118. The lower portion of the filter housing 112 below the filter element 118 is then filled and slightly pressurized but still having a significant less pressure than the hot water supply line 162. The water in the lower portion of the filter housing 112 is then filtered as it flows through semipermeable filter element 118. The filtered water then fills the upper portion of the filter housing 112 above the filter element 118 and flows up and out through the exit tube 134 and exit tube valve 138 for its end use.

The second stage of the self-cleaning water filter system 100 is the back flushing or cleaning stage of the filter element 118. Exit tube valve 138 is closed and the pressure between the cold water inlet tube 114, the exit tube 134, the hot water supply line 162, and the upper and lower portions of the filter housing 112 now become balanced or are the same pressure. At this time exit tube 134 supplies pressurized flow or energy through the perforations 122 of flow tube assembly 120 to pressure vessel tube 124 and this pressure or stored energy is saved in pressure vessel 128 for later use. This stored energy is produced by the gas pressurized flexible chamber 130 which is pre-filled with a gas such as air to a predetermined pressure through valve stem 132. When exit tube valve 138 is closed this pressurized flexible chamber 130, since it is a gas, can be compressed and therefore contracts or becomes smaller but at the same time the gas pressure further increases and energy stored because of its compression. When the hot water supply line valve 168 is opened the hot water supply line 162 and the lower portion of the filter housing 112 below filter element 118 become lower than the pressure in the upper portion of the filter housing 112 above the filter element 118 because one-way valve 152 is automatically opened. The stored energy or pressure is now released by pressure vessel 128. The flexible chamber 130 in the pressure vessel 128 now expands to a larger size as the energy is dissipated. A reverse flow is now produced which travels into flow tube assembly 120 from pressure vessel tube 124 and then out the flow tube assembly perforations 122 spaced about 90° apart facing towards filter element 118 so as to produce sprays from the perforations 122 that impinge upon adjacent sprays to result in at least a partial perpendicular direction toward filter element 118. At this point the pressure in the upper portion of the filter housing 112 above the filter element 118 is greater than that of lower portion of the filter housing 112 below the filter element 118 thus allowing this stored clean water to flow in the opposite direction then before through and back flushing filter element 118. In combination, the cold water inlet tube 114 also has a smaller flow supplying water that travels up and along the angled bottom 119 of the filter element 118 to produce a scouring effect to pull off debris and particles off the filter element 118. This now dirty fluid is now forced out through the vibration device 140 and tube 150, and then through the one-way valve 152 and second tube 160 into hot water supply line 162. Since tube 150 is smaller compared to cold water inlet tube 114, exit tube 134, and hot water supply line 162, the amount of cold water mixing with the hot water in hot water supply line 162 is very small therefore not noticeable to the slightly lower pressure in hot water supply line 162.

It has been found that vibration of the filter element 118 is highly effective in cleaning off particles therefrom. When the above-described back flushing occurs, fluid flow is traveling through tube 150 and since it is smaller, a high velocity of flow activates the flow powered vibration device 140 which is rigidly connected to the filter housing 112 therefore vibrating the filter element 118 during the back flushing stage. When the opening and closing of one-way valve 152 occurs, water hammer maybe present therefore as an added precaution the water hammer dampening device 164 is fluidly connected to hot water supply line 162 adjacent of the one-way valve 152 to prevent damage to the self-cleaning water system 100.

While a preferred embodiment of the self-cleaning water filter system has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. For example, any suitable sturdy material such as, but not limited to, metal, plastic, fiberglass, or composite material may be used instead of the illustrated and/or described. And although removing particulate matter from drinking water using a back flushable filter system have been described, it should be appreciated that the self-cleaning water filter system herein described is also suitable for filtering all fluids desirable for having a back flushing system.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A self-cleaning water filter system for removing particulate matter from water, said self-cleaning water filter system comprising:
   a filter housing having an upper portion, a lower portion, and an internal cavity, said filter housing being connected to a water inlet tube, an exit tube and a water supply line;
   a filter element positionable within said filter housing;
   a pressure vessel in fluid communication with said filter housing, said pressure vessel having a pressurizable flexible chamber that expands and contracts due to the pressure in said filter housing; and
   a vibration device attachable to and in fluid communication with said water supply line and with the lower portion of said filter housing below said filter element, said vibration device having an inbalanced wheel including a plurality of paddles thereon.

2. The self-cleaning water filter system as set forth in claim 1 further comprising a one-way valve attachable to and in fluid communication with said vibration device and said water supply line.

3. The self-cleaning water filter system as set forth in claim 2, wherein said one-way valve is a spring loaded ball valve.

4. The self-cleaning water filter system as set forth in claim 3, wherein said exit tube and said water supply line each has a valve.

5. The self-cleaning water filter system as set forth in claim 1, wherein said filter housing and said filter element are cylindrical in configuration, and wherein said filter element has a centrally defined bore therethrough.

6. The self-cleaning water filter system as set forth in claim 5, wherein the upper portion of said filter housing further comprising a manifold attachable to said water inlet tube, wherein at least one perforate flow tube extends down from said manifold into an outer chamber defined between said filter element and said filter housing.

7. The self-cleaning water filter system as set forth in claim 6, wherein said exit tube is connected to and in fluid communication with said perforated flow tube, said perforated flow tube passes through said manifold and is received in said bore of said filter element.

8. The self-cleaning water filter system as set forth in claim 7 further comprising at least one additional perforated flow tube located between said filter element and said filter housing and wherein said additional perforated flow tube defines at least two rows of perforations with each row directed at a tangential direction toward said filter element, and wherein said perforated flow tube defines at least four rows of perforations.

9. The self-cleaning water filter system as set forth in claim 1, wherein said filter housing and said filter element are rectangular in configuration, and wherein said filter element has a bottom angled from said water inlet tube thereby producing a scouring effect pulling off debris from said filter element when a flow is present across said bottom of said filter element.

10. The self-cleaning water filter system as set forth in claim 9 further comprising a perforated flow tube attachable to said pressure vessel and has a single continuous outer perforated flow tube in a generally rectangular configuration with at least one internal perforated flow tube connected internally of and in fluid communication with said outer flow tube.

11. A self-cleaning water filter system comprising:
a filter housing having an upper portion, a lower portion, and an internal cavity, said filter housing being connected to a water inlet tube, an exit tube and a water supply line;
a filter element positionable within said filter housing;
a pressure vessel in fluid communication with said filter housing, said pressure vessel having a pressurizable flexible chamber that expands and contracts due to the pressure in said filter housing;
a vibration device attachable to and in fluid communication with said water supply line and with the lower portion of said filter housing below said filter element, said vibration device having an inbalanced wheel including a plurality of paddles thereon; and
a one-way valve attachable to and in fluid communication with said vibration device and said water supply line.

12. The self-cleaning water filter system as set forth in claim 11, wherein said wherein said filter housing and said filter element are cylindrical in configuration, and wherein said filter element has a centrally defined bore therethrough.

13. The self-cleaning water filter system as set forth in claim 12, wherein the upper portion of said filter housing further comprising a manifold attachable to said water inlet tube, wherein at least one perforate flow tube extends down from said manifold into an outer chamber defined between said filter element and said filter housing.

14. The self-cleaning water filter system as set forth in claim 13, wherein said exit tube is connected to and in fluid communication with said perforated flow tube, said perforated flow tube passes-through said manifold and is received in said bore of said filter element.

15. The self-cleaning water filter system as set forth in claim 14 further comprising at least one additional perforated flow tube located between said filter element and said filter housing and wherein said additional perforated flow tube defines at least two rows of perforations with each row directed at a tangential direction toward said filter element, and wherein said perforated flow tube defines at least four rows of perforations.

16. The self-cleaning water filter system as set forth in claim 11, wherein said filter housing and said filter element are rectangular in configuration, and wherein said filter element has a bottom angled from said water inlet tube thereby producing a scouring effect pulling off debris from said filter element when a flow is present across said bottom of said filter element.

17. The self-cleaning water filter system as set forth in claim 16 further comprising a perforated flow tube is attachable to said pressure vessel and has a continuous outer perforated flow tube in a generally rectangular configuration with at least one internal perforated flow tube connected internally of and in fluid communication with said outer flow tube.

18. The self-cleaning water filter system as set forth in claim 11, wherein said water inlet tube is a cold water inlet tube, said water supply line is a hot water supply line including a water hammer dampening device and a hot water supply line valve, said water hammer dampening device being connected to and in fluid communication with said hot water supply line adjacent of said one-way valve, said hot water supply line valve being located adjacent of said water hammer dampening device, and wherein said exit tube includes an exit tube valve located adjacent of said filter housing.

19. A self-cleaning water filter system comprising:
a filter housing having an upper portion, a lower portion, and an internal cavity, said filter housing having a generally rectangular configuration;
a water inlet tube connectable to the lower portion of said filter housing;
an exit tube connectable to the upper portion of said filter housing;
a filter element positionable within said filter housing above said water inlet tube, said filter element having a generally rectangular configuration and a bottom angled from said water inlet tube thereby producing a scouring effect pulling off debris from said filter element when a flow is present across said bottom of said filter element;
a pressure vessel connectable and in fluid communication with said filter housing above said filter element, said pressure vessel having a pressurizable flexible chamber that expands and contracts due to the pressure in said filter housing;
a perforated flow tube assembly positionable in said filter housing above said filter element, said perforated flow tube assembly being connectable to and in fluid communication with said pressure vessel, said perforated flow tube assembly has a continuous outer perforated flow tube in a generally rectangular configuration and at least one internal perforated flow tube connected internally of and in fluid communication with said outer flow tube;
a vibration device attachable to and in fluid communication with the lower portion of said filter housing below said filter element, said vibration device having an inbalanced wheel including a plurality of paddles thereon for producing a vibratory motion to said filter housing when a tangential flow is present across said paddles of said imbalanced wheel; and a one-way valve attachable to and in fluid communication with said vibration device and said water supply line, said one-way valve being spring loaded;

wherein said outer and internal flow tubes of said perforated flow tube assembly each has at least two rows of perforations facing towards said filter element, said perforations being arranged so that any flow out of said perforations impinge upon adjacent flows from adjacent perforations to result in at least a partial perpendicular direction toward said filter element.

* * * * *